(12) United States Patent
Shirakawa et al.

(10) Patent No.: US 6,462,106 B2
(45) Date of Patent: Oct. 8, 2002

(54) AMINO-POLYETHER-MODIFIED EPOXY AND CATIONIC ELECTRODEPOSITION PAINT COMPOSITION CONTAINING THE SAME

(75) Inventors: Shinsuke Shirakawa, Okasa-fu (JP); Mitsuo Yamada, Osaka-fu (JP)

(73) Assignee: Nippon Paint Co., Ltd., Osaka-Fu (JP)

( * ) Notice: Subject to any disclaimer, the term of this patent is extended or adjusted under 35 U.S.C. 154(b) by 0 days.

(21) Appl. No.: 09/768,245

(22) Filed: Jan. 25, 2001

(65) Prior Publication Data

US 2002/0010231 A1 Jan. 24, 2002

(30) Foreign Application Priority Data

Jan. 31, 2000 (JP) ........................................ 2000-021707

(51) Int. Cl.⁷ ............................ C08K 3/20; C08L 63/02
(52) U.S. Cl. ..................... 523/404; 523/414; 525/530; 525/533; 528/96; 528/111.3; 528/121; 528/418; 528/419
(58) Field of Search .................................. 523/404, 414; 525/530, 533; 528/96, 111.3, 121, 418, 419

(56) References Cited

U.S. PATENT DOCUMENTS 5,977,247 A * 11/1999 Schafheutle et al. ........ 523/414

* cited by examiner

Primary Examiner—Robert Dawson
Assistant Examiner—D. Aylward
(74) Attorney, Agent, or Firm—Wenderoth, Lind & Ponack, L.L.P.

(57) ABSTRACT

Disclosed is a novel amino-polyether-modified epoxy for an electrodeposition paint. The amin-polyether-modified epoxy compound is obtained by reacting amino polyether represented by a formula as follow:

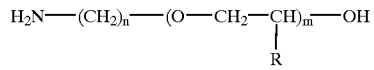

wherein m is an integer of 5 or more, R is hydrogen, methyl group or ethyl group, and n is 2 or 3, with polyglycidyl ether having a molecular weight of 1,000 to 7,000 and an epoxy equivalent of 500 to 3,500, wherein an equivalent ratio of a primary amino group of the amino polyether to an epoxy group of the polyglycidyl ether is controlled within the range of 0.52 to 1.0.

8 Claims, No Drawings

AMINO-POLYETHER-MODIFIED EPOXY AND CATIONIC ELECTRODEPOSITION PAINT COMPOSITION CONTAINING THE SAME

FIELD OF THE INVENTION

The present invention relates a novel amino-polyether-modified epoxy and an electrodeposition paint composition containing the same.

BACKGROUND OF THE INVENTION

In order to protect metal materials from corrosion and keep their good appearance during using, they are provided with coating on the surfaces. Especially, as electrodeposition coating can simply and speedy form uniform coatings on surfaces of metal materials, it is industrially and widely used for coating metal materials having large surfaces to be coated, such as automobile bodies.

In an electrodeposited coating used in an automobile body, enhancement of adhesion with a substrate, an intermediate-coated or a top-coated coating provided on the substrate as well as enhancement of flexibility for improving chipping resistance are especially desired. Various compounds and resins are used to provide an electrodeposited coating with the flexibility.

For example, Japanese Laid-Open Patent Application Nos. 59-117560 and 6-87947 describe a cationic electrodeposition paint composition which contains a reaction product of polyepoxide with polyoxyalkylene amine.

However, when this reaction product is used as a component of a cationic electrodeposition paint composition, flexibility can be provided, but it adversely reduces adhesion with a substrate, an intermediate-coated or a top-coated coating provided on the substrate decreases.

Lately, it is strongly desired that an amount of solvent exhausted into air decrease, from a point of view of global environment, especially prevention of air pollution.

OBJECT OF THE INVENTION

The present invention solves the problems as mentioned above and an object of the present invention is to provide a novel amino-polyether-modified epoxy and a cationic electrodeposition paint composition using the same as a flexible resin, so as to impart flexibility to an electrodeposited coating, with keeping adhesion with a substrate, an intermediate-coated or a top-coated coating as well as to decrease an amount of solvent used in electrodeposition paint in comparison with conventional one.

DETAILED DESCRIPTION OF THE INVENTION

The present invention is a novel amino-polyether-modified epoxy obtained by reacting amino polyether represented by a formula as follow:

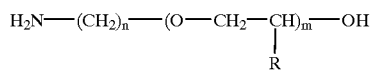

wherein m is an integer of 2 or more, R is hydrogen, methyl group or ethyl group, and n is 2 or 3,
with polyglycidyl ether having a molecular weight of 1,000 to 7,000 and an epoxy equivalent of 500 to 3,500, wherein an equivalent ratio of a primary amino group of the above amino polyether to an epoxy group of the above polyglycidyl ether is controlled within the range of 0.52 to 1.0.

In the above formula of the amino polyether, one example is that, m is an integer from 5 to 25, R is methyl group, and n is 2. It is preferred that a molecular weight of the amino-polyether-modified epoxy is within the range of 10,000 to 100,000.

The above polyglycidyl ether can be obtained from polyoxy alkylene glycol diglycidyl ether having a molecular weight of 500 to 1,000 and a polycyclic phenol compound. A dicarboxylic acid containing a long chain alkyl group can be added to the above two reactants. The above polyoxyalkyleneglycol diglycidyl ether may be polyoxypropyleneglycol diglycidyl ether and the above polycyclic phenol compound is bisphenol A. The above dicarboxylic acid containing a long chain alkyl group is a dimer acid. In addition, the present invention provides a cationic electrodeposition paint composition comprising a flexible resin comprising the above amino-polyether-modified epoxy, an amine-modified epoxy resin and a blocked polyisocyanate curing agent, for example the above amine-modified epoxy resin contains an oxazolidone ring.

An amino-polyether-modified epoxy of the present invention is characterized in that it is obtained by reacting amino polyether represented by a formula as follow:

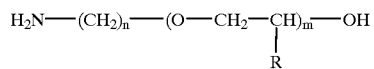

wherein m is an integer of 2 or more, R is hydrogen, methyl group or ethyl group, and n is 2 or 3,
with polyglycidyl ether having a molecular weight of 1,000 to 7,000 and an epoxy equivalent of 500 to 3,500, wherein an equivalent ratio of a primary amino group of the above amino polyether to an epoxy group of the above polyglycidyl ether is controlled within the range of 0.52 to 1.0.

The above amino polyether can be obtained by adding alkylene oxide to monoethanol amine.

The above amino polyether, as represented by the above formula, has a polymethylene chain which has a primary amino group at one end and has a polyoxyalkylene chain having a terminal hydroxy group at the other end.

In the formula, m shows number of repeating units of polyoxyalkylene chain, which is preferably an integer from 5 to 25, more preferably an integer from 10 to 25. R in a polyoxyalkylene chain is preferably hydrogen or methyl group. In addition, R is usually the same, but may be two types or more. In the above formula, n represents number of repeating units of polymethylene chain bonding to a primary amino group and generally is 2 or 3, but 2 is more suitable.

The above polyglycidyl ether used in the present invention has a molecular weight of 1,000 to 7,000 and an epoxy equivalent of 500 to 3,500.

If polyglycidyl ether has a molecular weight of less than 1,000 and/or an epoxy equivalent of less than 500, an electrodeposited coating formed with a cationic electrodeposition paint containing an amino-polyether-modified epoxy obtained by using the polyglycidyl ether does not provide with sufficient flexibility. On the other hand, if polyglycidyl ether has a molecular weight of more than 7,000 and/or an epoxy equivalent of more than 3,500, adhesion between the electrodeposited coating and an intermediate-coated or a top-coated coating coated thereon decreases.

The above polyglycidyl ether compound can be obtained by reacting polyoxy alkylene diglycidyl ether having a molecular weight of 500 to 1,000 with a polycyclic phenol compound. The polyglycidyl ether compound can preferably be polyoxy alkylene glycol diglycidyl ether, which includes polyoxyethyleneglycol diglycidyl ether (epoxy ether of polyethylene glycol), polyoxypropyleneglycol diglycidyl ether, polyoxyisopropyleneglycol diglycidyl ether, polyoxybutyleneglycol diglycidyl ether and the like. Especially, polyoxyisopropyleneglycol diglycidyl ether is preferable.

The polyoxyalkyleneglycol diglycidyl ether preferably has a molecular weight of 500 to 1,000. If the molecular weights are less than 500, the resulting electrodeposited coating leads to decrease of impact resistance, and if the molecular weights are more than 1,000, adhesion with an intermediate-coated or a top-coated coating is defective.

The polycyclic phenol compound used herein can be one that used as a component in synthesis of an amine-modified epoxy resin that is a binder component in a general cationic electrodeposition paint composition. To be specific, it includes bisphenol A, bisphenol F, bisphenol S, phenol novolak cresol novolak, and the like. Especially, bisphenol A is preferable.

A molecular weight of the above polyglycidyl ether can be controlled by adjusting a formulating amount of the above polyoxy alkylene glycol diglycidyl ether and the above polycyclic phenol compound.

If necessary, the molecular weight can be also controlled by formulating a suitable amount of a dicarboxylic acid containing a long chain alkyl group. Examples of the dicarboxylic acids include 1,10-dodecane dicarboxylic acid, adipic acid and the like, especially, a dimer acid (available as, Barsadime 216) being preferable.

When the above thee components are polyoxyisopropyleneglycol diglycidyl ether, bisphenol A and dimer acid (available as, Barsadime), a formulating ratio can be controlled in 60 to 90/5 to 30/0 to 30 by weight to obtain a polyglycidyl ether having an objective molecular weight.

The amino-polyether-modified epoxy of the present invention is obtained by reacting the above amino polyether with the above polyglycidyl ether. When these two compounds are reacted, it is required that an equivalent ratio of a primary amino group of the above amino polyether to an epoxy group of the above polyglycidyl ether is controlled within the range of 0.52 to 1.0. If an equivalent ratio is less than 0.52, the resulting amino-polyether-modified epoxy keeps a portion of epoxy groups unreacted at an end of its molecule and proceeds polymerization to result in gellationl. On the other hand, if an equivalent ratio is more than 1.0, the resulting epoxy has a low molecular weight and an amino polyether remains therein to decrease stability of paint.

The amino-polyether-modified epoxy of the present invention preferably has a molecular weight of 10,000 to 100,000. If an amino-polyether-modified epoxy has a molecular weight of less than 10,000, an electrodeposited coating obtained by using it has poor impact resistance, while if an amino-polyether-modified epoxy has a molecular weight of more than 100,000, appearance of an electrodeposited coating is aggravated and adhesion of the electrodeposited coating with an intermediate-coated or a top-coated coating coated thereon decrease. In addition, the high molecular weight leads to high viscosity, and does not sufficiently perform a function as a reactive diluent, which results in incapability of reducing an amount of solvent to be used.

Then a method for synthesizing the amino-polyether-modified epoxy of the present invention will be explained.

The reaction of polyoxyalkyleneglycol diglycidyl ether with polycyclic phenol can be carried out by a art-known method generally used in synthesis of an epoxy resin. For example, a predetermined amount of polyoxyalkyleneglycol diglycidyl ether and a phenol compound are poured in a reaction vessel and heated with stirring, to which a catalyst, such as benzyl dimethyl amine, 2-ethyl-4-methyl-imidazole and the like, is added to proceed a reaction, or if necessary, a dicarboxylic acid containing a long chain alkyl group to adjust a molecular weight, such as a dimer acid and the like, is added and reacted together to obtain polyglycidyl ether. A predetermined amount of amino polyether is then added and heated again to react with the polyglycidyl ether obtained above, thus obtaining the amino-polyether-modified epoxy of the present invention.

Then, a cationic electrodeposition paint of the second embodiment of the present invention will be specifically explained.

The cationic electrodeposition paint composition of the present invention comprises a flexible resin composed of the above amino-polyether-modified epoxy, an amine-modified epoxy resin and a blocked polyisocyanate curing agent.

The amine-modified epoxy resin can be one that has been used in cationic electrodeposition paint. Some of the resins are explained in Japanese Patent Publication Nos. 55-34238, 56-34186 and 59-15929. It is preferably used that the above amine-modified epoxy resin has a molecular weight of 600 to 8,000, an amine value of 16 to 230 and an epoxy equivalent of 300 to 4,000.

These amine-modified epoxy resins can be produced by ring-opening all epoxy rings of a bisphenol type epoxy resin with an active hydrogen compound which can introduce a cationic group, or by ring-opening a portion of epoxy rings with another active hydrogen, of which remaining epoxy rings are reacted with an active hydrogen compound which can introduce a cationic group.

A typical example of the above bisphenol type epoxy resin is bisphenol A type or bisphenol F type epoxy resin. Bisphenol A type epoxy resins are commercially available, including Epycoat 828 (available from Yuka Shell Epoxy Co., epoxy equivalent of 180 to 190), Epycoat 1001 (available from Yuka Shell Epoxy Co., epoxy equivalent of 450 to 500), Epycoat 1010 (available from Yuka Shell Epoxy Co., epoxy equivalent of 3,000 to 4,000) and the like. Bisphenol F type epoxy resins are also commercially available, including Epycoat 807 (available from Shell Epoxy Petrochemical Corporation, epoxy equivalent of 170) and the like.

The active hydrogen compound which can introduce a cationic group includes primary amine and secondary amine. Examples thereof include butylamine, octylamine, diethylamine, dibutylamine, methylbutylamine, monoethanolamine, diethanolamine and N-methylethanolamine and a secondary amine with a ketiminized primary amine, such as a ketimine of amino ethyl ethanol amine or diketimine of diethylene triamine. These amines may be used in combination.

The other active hydrogen compound which can be used for ring-opening an epoxy ring includes monophenols, such as phenol, cresol, nonylphenol and nitrophenol; monoalcohols, such as hexyl alcohol, 2-ethylhexanol, stearyl alcohol and monobutyl- or monohexyl-ether of ethylene glycol or propylene glycol; aliphatic monocarboxylic acids, such as stearic acid and octyric acid; aliphatic hydroxyl carboxylic acids, such as hydroxyl pivalic acid, lactic acid and citric acid; and mercaptoalkanols, such as mercaptoethanol.

The amine-modified epoxy resin is preferably an epoxy resin containing an oxazolidone ring in a backbone of the resin as disclosed in Japanese Laid-Open Patent Application Nos. 5-306327, 6-329755 and 7-33848. Details of the above amine-modified epoxy resin containing an oxazolidone ring will be explained hereinafter.

It is known that a bifunctional epoxy resin is reacted with a diisocyanate compound blocked with a monoalcohol, i.e. bisurethane, to obtain a chain-extended epoxy resin containing an oxazolidone ring. An epoxy group of the chain-extended epoxy resin is ring-opened with an amine to obtain an amine-modified epoxy resin, which is one of amine-modified epoxy resin containing an oxazolidone ring. In addition, by the method as disclosed in the above Japanese Laid-Open Patent Application No. 7-33848, one isocyanate group of a diisocyanate compound is reversibly blocked with a monoalcohol and the other isocyanate group is irreversibly blocked with a compound containing a hydroxyl group to obtain an asymmetric bisurethane compound, which is reacted with bifunctional epoxy resin to obtain an modified epoxy resin containing an oxazolidone ring. An epoxy ring of the modified epoxy resin thus obtained is ring-opened with an active hydrogen compound that can introduce a cationic group, such as amine, to obtain a cationic modified epoxy resin.

In the above method, the hydroxyl compound which irreversibly blocks the one isocyanate group of the diisocyanate compound includes an aliphatic monoalcohol having 4 or more carbon atoms, such as butanol, 2-ethyl hexanol and the like; a long chain phenol, such as nonyl phenol; a glycol monoether, such as mono-2-ethyl hexyl ether of ethylene glycol or propylene glycol.

A blocked polyisocyanate curing agent contained in the cationic electrodeposition paint composition of the present invention is generally used in the art, and may generally be obtained by blocking a polyisocyanate. Examples of the polyisocianates are tolylene diisocyanate (TDI), 4,4'-diphenylmethane diisocyanate (MDI), xylene diisocyanate (XDI) and the like; an aliphatic or alicyclic diisocyanate compound, such as hexamethylene diisocyanate (HMDI), isophorone diisocyanate (IPDI), 2,5- or 2,6-bis (isocyanato methyl) bicyclo [2,2,1] heptane (NBDI) and the like; a dimer or trimer of the diisocyanate compound or one obtained by adding trimethylol propane to the diisocyanate compound.

A blocking agent used in the above blocked polyisocyanate curing agent is one that is attached to an isocyanate group to be stable at room temperature, but can dissocate to reproduce a free isocyanate group when heating above a dissociation temperature.

Concrete examples of the blocking agents are phenol type blocking agents, such as phenol, cresol, xylenol, chlorophenol and ethylphenonl; lactam type blocking agents, such as ε-caprolactam, δ-valerolactam, γ-butyrolactam and β-propiolactam; active methylene type blocking agents, such as ethyl acetoacetate and acetyl acetone; alcohol type blocking agents, such as methanol, ethanol, propanol, butanol, amylalcohol, ethylene glycol monomethyl ether, ethylene glycol monoethyl ether, ethylene glycol monomethyl ether, propylene glycol monomethyl ether, benzyl alcohol, methyl glycolate, butyl glycolate, diacetone alcohol, methyl lactate and ethyl lactate; oxime type blocking agents, such as formaldoxime, acetoaldoxime, acetoxime, methyl ethyl ketoxime, diacetyl monooxime and cyclohexaneoxime; mercaptan type blocking agents, such as butylmercaptan, hexylmercaptan, t-butylmercaptan, thiophenol, methyl thiophenol and ethyl thiophenol; acid amide type blocking agents, such as amide acetate and benzamide; imide type blocking agents, such as imide succinate and imide maleate; imidazole type blocking agents, such as imidazole and 2-ethyl imidazole; and the like. When curing at low temperature of 160° C. or less is required, lactam type and oxime type blocking agents are preferably used.

The cationic electrodeposition paint composition of the present invention is obtained by dispersing the flexible resin comprising the amino-polyether-modified epoxy, the amine-modified epoxy resin and the blocked polyisocyanate curing agent as mentioned above in an aqueous medium containing a neutralizer. When the above amino-polyether-modified epoxy is used as a flexible resin that is a component of a cationic electrodeposition paint composition, it is necessary that a neutralizer and ion-exchanged water are added to the amino-polyether-modified epoxy and stirred sufficiently to obtain a form of emulsion.

The neutralizer is not limited as long as it has been generally used in the production of cationic electrodeposition paint, but including inorganic acid or organic acid, such as hydrochloric acid, nitric acid, phosphoric acid, formic acid, acetic acid and lactic acid. The neutralizer is used in such an amount that it partially neutralizes amino groups in the above amino-polyether-modified epoxy to form an aqueous dispersion.

In order to keep stable the emulsion of an amino-polyether-modified epoxy thus obtained above, an amine value of the amino-polyether-modified epoxy is preferably contorolled to 32 meq or more per a solid content of 100 g. If the amino-polyether-modified epoxy has an amine value of less than 32 meq, its water dispensability decreases.

The cationic electrodeposition paint composition of the present invention usually contains a pigment-dispersed paste in addition to the flexible resin, the amine-modified epoxy resin, the blocked polyisocyanate curing agent and the neutralizer as mentioned above. The pigment-dispersed paste is prepared by dispersing a pigment together with a pigment-dispersing resin in an aqueous medium.

The above pigment is not limited especially if it is usually used, and includes color pigments, such as titanium white, carbon black and red oxide; filler pigments, such as kaolin, talc, aluminum silicate, calcium carbonate, mica, clay and silica; corrosion resistant pigments, such as zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate and aluminum phosphorus molybdate.

As the above pigment-dispersing resin, a cationic or nonionic surfactant having a low molecular weight or a modified epoxy resin having a quaternary ammonium group and/or a tertiary sulfonium group is generally used.

After given amounts of the resin for dispersing a pigment and the pigment as mentioned above are mixed, the pigment is dispersed in the resin using usual dispersion equipment, such as a ball mill and grind mill until the pigment in the mixture has a uniform and given particle size to obtain a pigment-dispersed paste.

More concretely, given amounts of the amine-modified epoxy resin and the blocked polyisocyanate curing agent as mentioned above are uniformly mixed, and the mixture is dispersed in an aqueous medium containing a neutralizer to obtain an emulsion (referred to as "main emulsion" hereinafter) of a mixture of the amine-modified epoxy resin and the blocked polyisocyanate curing agent. On the other hand, separately, the above flexible resin is made to an emulsion (referred to as "flexibility-providing emulsion" hereinafter) by a similar method (described as emulsion provided with flexibility as follow). The above main emulsion, the flexibility-providing emulsion, the above pigment-dispersing paste and ion-exchanged water are mixed in suitable amounts to obtain the cationic electrodeposition paint of the present invention.

However, the method for forming the emulsions of the above flexible resin, the above amine-modified epoxy resin and the above blocked polyisocyanate curing agent are not limited to those as mentioned above. For another example, the above three components may be separately emulsified or all of the three components may be mixed together and then emulsified.

The above flexible resin of the present invention is preferably added within the range of 1 to 30 weights % based on total solid resin contents in the cationic electrodeposition paint composition. If an amount is less than 1 weight %, an electrodeposited coating is provided with insufficient flexibility and a solvent amount does not reduce effectively. On the other hand, if an amount is more than 30 weights %, the corrosion resistance of an electrodeposited coating would be deteriorated.

An amount of the above blocked polyisocyanate curing agent may be enough to react with a functional group having an active hydrogen, such as amino group and hydroxyl group in the above amine-modified epoxy resin to provide an excellent cured coating when curing. It is therefore general that a weight ratio of a solid content of the above amine-modified epoxy resin to a solid content of the above blocked polyisocyanate curing agent is within the range of 90/10 to 50/50, preferably 80/20 to 65/35.

The above blocked polyisocyanate curing agent is also reacted with a hydroxyl group in the above flexible resin, but the above amount can be enough to react with the hydroxyl group.

The above pigment-dispersed paste is formulated in such an amount that a weight ratio of the above pigment to a total solid content of the resins in a cationic electrodeposition paint is within the range of 1 to 35%.

The cationic electrodeposition paint of the present invention can contain tin compounds, such as dibutyltin dilaurate and dibutyltin oxide or a usual urethane cleavage catalyst. An amount thereof is preferably within the range of 0.1 to 5.0 weights % based on the above blocked polyisocyanate curing agent.

The cationic electrodeposition paint of the present invention may contain conventional additives for paint, such as water-miscible organic solvent, surfactant, antioxidant, ultraviolet-absorbent and the like.

EXAMPLES

The present invention is further illustrated in detail with reference to the following examples, but the present invention is not limited to them. In the examples, "parts" and "%" are based on weight, otherwise they are especially decided. "epoxy equivalent" and "amine equivalent" express values per solid contents.

Productive Example 1

Production of Amine-modified Epoxy Resin

In a flask equipped with an agitator, a condenser tube, a nitrogen introduction tube, a thermometer and a dropping funnel, 92 parts of 2,4-/2,6-tolylene diisocyanate (weight ratio=8/2), 95 parts of methyl isobutyl ketone (described as MIBK as follow) and 0.5 parts of dibutyltin dilaurate were poured. With stirring the mixture, 21 parts of methanol was added thereto. The reaction started with room temperature and exothermed to a temperature 60° C. After keeping the reaction for 30 minutes, 57 parts of ethylene glycol mono-2-ethylhexyl ether was added dropwise by the dropping funnel. Next, 42 parts of an adduct of bisphenol A-5 mole propylene oxide (available from Sanyo Kasei Co. as Newpole BP-5P.) was added otherto. The reaction was continued at a temperature between 60° C. and 65° C. until an absorption based on an isocyanate group disappeared in a measurement of IR spectroscopy.

Then, 365 parts of bisphenol A type epoxy resin (Trade Name, DER-331J available from Dow Chemicals Co.) having an epoxy equivalent of 188 was added to the above reaction mixture and heated to 125° C. To the content, 1.0 part of benzyldimethylamine was added and reacted at 130° C. until an epoxy equivalent was 410.

Subsequently, 87 parts of bisphenol A was added thereto and reacted at 120° C. to obtain an epoxy equivalent of 1190. After cooling the above reaction mixture, 11 parts of diethanolamine, 24parts of N-ethylethanolamine and 25 parts of 79% of an MIBK solution of a ketiminized product of aminoethylethanolamine were added and reacted at 110° C. for 2 hours. The mixture was then diluted with MIBK until it had a non-volatile content of 80% to form an amine-modified epoxy resin having a resin-solid content of 80%.

Productive Example 2

Synthesis of Blocked Polyisocyanate Curing Agent

In the same flask of Productive Example 1, 723 parts of 2,5- and 2,6-bis (isocyanato methyl) bicyclo [2.2.1] heptane (having an isocyanate equivalent of 103, available from Mitsui Toatsu Co.), 333 parts of MIBK and 0.01 parts of dibutyl tin dilaurate were poured. The obtained reaction mixture was heated to 70° C. to dissolve it uniformly, and 610 parts of methyl ethyl ketoxime was then added dropwise for a period of 2 hours. After completing dropping, the reaction was continued with keeping a reaction temperature of 70° C. until an absorption based on an isocyanate group disappeared in a measurement of IR spectroscopy to obtain a methylethylketoxime-blocked polyisocyanate curing agent having a resin solid content of 80%.

Productive Example 3

Production of Resin for Dispersing a Pigment

In a reaction vessel equipped with an agitator, a condenser tube, a nitrogen introduction tube and a thermometer, 222.0 parts of isophorone diisocyanate (described as IPDI as follow) was poured and diluted with 39.1 parts of MIBK, to which 0.2 parts of dibutyl tin laurate was then added. After heating it to 50° C., 131.5 parts of 2-ethyl hexanol was added dropwise with stirring in a dry nitrogen atmosphere for a period of 2 hours. The mixture was suitably cooled to keep the reaction temperature of 50° C. As a result, 2-ethyihexanol-half-blocked IPDI was obtained.

Next, 376.0 parts of Epycoat 828 (bisphenol A type epoxy resin having an epoxy equivalent of 182 to 194, available from Yuka Shell Epoxy Co.), 114.0 parts of bisphenol A and 28.8 parts of octylic acid were poured in a reaction vessel equipped with an agitator, a condenser tube, a nitrogen introduction tube and a thermometer. A reaction mixture was heated to 130° C. in a nitrogen atmosphere, and 0.15 parts of dimethylbenzylamine was added and exothermidcally reacted at 170° C. for one hour to obtain a bisphenol A type epoxy resin having an epoxy equivalent of 649. After cooling it to 140° C., 396.8 parts of 2-ethyl hexanol-half-blocked IPDI prepared above was added and kept at 140° C. for one hour to react. Then, 323.2 parts of ethylene glycol monobutyl ether was added to dilute and the reaction mixture was cooled to 100° C. Subsequently, 188.8 parts of 78.3% of an MIBK solution of a ketiminized product of aminoethylethanolamine with methyl isobutyl ketone was added. The mixture was then incubated at 110° C. for one hour and then cooled to 90° C., to which 360.0 parts of ion-exchanged water was added. Stirring was continued for another 30 minutes to convert a ketimine portion in the epoxy resin to a primary amino group. After removing excess water and MIBK from the mixture under reduced pressure, it was diluted with 575.8 parts of ethylene glycol monobutyl ether to obtain a pigment dispersing resin having a primary amino group and a resin-solid content of 50%.

Productive Example 4

Production of Pigment-dispersing Paste

In a sand grind mill, 120 parts of the pigment dispersing resin obtained in Productive Example 3, 2.0 parts of carbon black, 100.0 parts of kaolin, 80.0 parts of titanium dioxide, 18.0 parts of aluminum phosphorus molybdate and 200 parts of ion-exchanged water were poured and dispersed until a particle size was 10μm or less to obtain a pigment-dispersed paste.

Example 1

Synthesis of Amino-polyether-modified Epoxy A (Flexible Resin A)

In a reaction vessel equipped with an agitator, a thermometer, a reflux condenser tube and a nitrogen introduction tube, 677.6 parts of Chemiol EP-400P (polypropylene glycol diglycidyl ether having an epoxy equivalent of about 294, available from Sanyo Kasei Industrial Co.) and 66.4 parts of bisphenol A were added and heated to 140° C. with stirring. To the content, 0.6 parts of benzyl dimethyl amine was added and incubated at 175° C. for 4 hours to obtain a polyepoxide having an epoxy equivalent of 432. Then, 251.5 parts of Barsadime 216 (dimer acid having an acid value of 192, available from Henkel Hakusui Co.) and 0.1 part of benzyl dimethyl amine were added thereto and reacted at 160° C. until an acid value was 0.5 or less to obtain polyglycidyl ether having a molecular weight of 2312 and an epoxy equivalent of 1156. To the compound, 494.5 parts of amino polyether having an amine value of 32.3 (an adduct of monoethanolamine and ethylene oxide, available from Sanyo Kasei Industrial Co.) was added and incubated at 80° C. for 4 hours to obtain an amino-polyether-modified epoxy A (referred to as "flexible resin A" hereinafter) having an amine equivalent of 323 and a molecular weight of 29,700.

Examples 2 and 3

Synthesis of Amino-polyether-modified Epoxies B and C (Flexible Resins B and C)

Amino-polyether-modified epoxies B and C (referred to as "flexible resins B and C" hereinafter) were from the formulation shown in Table 1 obtained as generally described in with Example 1.

Example 4

Production of Cationic Electrodeposition Paint Composition

To the flexible resin produced in Example 1, 128.6 parts of the blocked polyisocyanate curing agent obtained in Productive Example 2 was added and incubated at 80° C. for 30 minutes. The resin mixture was added to a mixture of 20 parts of 50% of lactic acid and 345.8 parts of ion-exchanged water and then sufficiently stirred, to which 218.3 parts of ion-exchanged water was further added slowly to obtain an emulsion of a mixture of a flexible resin and a blocked polyisocyanate curing agent.

On the other hand, separately, the amine-modified epoxy resin obtained in Productive Example 1 and the blocked polyisocyanate curing agent obtained in Productive Example 2 were uniformly mixed at a mixing ratio of 70:30 based on solid contents. To the mixture, glacial acetic acid was added to neutralize to a neutralization percentage of 43%. The mixture was stirred, and ion-exchanged water was then added and slowly diluted to obtain an emulsion. Then MIBK was removed under a reduced pressure so that the emulsion had a solid content of 36.0%. The emulsion thus obtained was made to be a main emulsion.

Subsequently, 1,527.3 parts of the main emulsion, 343.8 parts of the pigment-dispersing paste obtained in Productive Example 4, 169.7 parts of the emulsion of the mixture of the flexible resin and the blocked polyisocyanate curing agent prepared above, 1952.7 parts of ion-exchanged water and 6.5 parts of dibutyl tin oxide were mixed to obtain a cationic electrodeposition paint composition having a solid content of 20.0 parts. A solid content ratio of a pigment content to a total resin content in the electrodeposition paint was 1/4.5 by weight. An amount of solvent in the paint was 1.0%.

The cationic electrodeposition paint composition obtained above was subjected to evaluations of impact resistance and adhesion with a top coating, and the results are shown in Table 2. The evaluations of impact resistance and adhesion with a top coating were carried out as follow.

(A) Impact resistance

A cationic electrodeposition paint was electrodeposited on a steel plate treated with zinc phosphate at such a voltage that a cured film had a thickness of 20 μm and cured at 160° C. for 15 minutes. To the obtained electrodeposited steel plate, Dupont Impact Test (½ inch, 500 g) was carried out under a condition of 20° C. to show a height at which not defects, such as peeling off of a coating, a crack and the like accured.

(B) Adhesion with a top coating

On an electrodeposited steel plate obtained in the same way with the case of impact resistance, an alkyd type top coating paint (Orgaselectsilver available from Nippon Paint Co.) was spray-coated in a dry thickness of 25 to 30 μm and cured at 140° C. for 20 minutes. After cooling it, 100 cross-cuts having a size of 2 mm×2 mm were formed by knife, on which an adhesive tape was adhered. The tape was rapidly peeled off and number of cross-cuts kept on the coated surface was evaluated.

Examples 5 and 6

Production of Cationic Electrodeposition Paint Composition

A cationic electrodeposition paint was prepared as generally described in Example 4, with the exception that the flexible resin of Example 2 or 3 was used as a flexible resin instead of the flexible resin of Example 1 and impact resistance and adhesion with a top coating were evaluated. An amount of solvent in each Example was 1.0% for Example 5 and 1.1% for Example 6. The results are shown in Table 2.

Comparative Example 1

In a reaction vessel equipped with an agitator, a thermometer, a reflux condenser tube and a nitrogen introduction tube, 730.1 parts of Chemiol EP-400P (polypropylene glycol diglycidyl ether having an epoxy equivalent of 294, available from Sanyo Kasei Industrial Co.) and 55.0 parts of bisphenol A were added and heated to 140° C. with stirring. To the content, 0.6 parts of benzyl dimethyl amine was then added. After incubating it at 175° C. for 4 hours, a polyglycidyl ether having an epoxy equivalent of 393 and a molecular weight of 785 was obtained. To the compound, 1131.9 parts of amino polyether having an amine value of 54.5 (an adduct formed by adding monoethanol amine to ethylene oxide, available from Sanyo Kasei Co.) was added and incubated at 80° C. for 4 hours to obtain an amino-polyether-modified epoxy (flexible resin D) having an amine equivalent of 57.4 and a molecular weight of 19,300.

Then, a cationic electrodeposition paint was prepared as generally described in Example 4, with exception that the flexible resin D obtained above was used as a flexible resin instead of the flexible resin A, and impact resistance and adhesion with a top coating were similarly evaluated. The results are shown in Table 2.

Comparative Example 2

Then, 1697.0 parts of the main emulsion obtained in Example 4, 343.8 parts of pigment-dispersed paste obtained in Productive Example 4, 1952.7 parts of ion-exchanged water and 6.5 parts of dibutyl tin oxide were mixed to obtain a cationic electrodeposition paint having a solid content of 20.0 parts. A ratio of a pigment content to a total resin content in the electrodeposition paint was ¼.5 by weight based on a solid content.

For the cationic electrodeposition paint obtained above, impact resistance and adhesion with a top coating were evaluated. The results are shown in Table 2. An amount of solvent in the cationic electrodeposition paint obtained herein was 1.5%.

Comparative Example 3

A flexible resin E was obtained from the formulation shown in Table 1 by as generally described in Comparative Example 1. A cationic electrodeposition paint was prepared as generally described in Example 4, with the exception that the flexible resin E was used, and impact resistance and adhesion with a top coating were similarly evaluated. The results are shown in Table 2.

The electrodeposited coatings of Examples and Comparative Examples had excellent appearance.

TABLE 1

|  | Example 1 | Example 2 | Example 3 | Comparative Example 1 | Comparative Example 3 |
|---|---|---|---|---|---|
| Flexible resin | A | B | C | D | E |
| EP-400P*1 (parts) | 677.6 | 823.2 | 823.2 | 730.1 | 592.7 |
| Bisphenol A (parts) | 66.4 | 159.6 | 159.6 | 55 | 205.2 |
| Barsadime 216*2 (parts) | 251.5 | 0 | 0 | 0 | 0 |
| Molecular weight of polyglycidyl ether | 2,312 | 1,404 | 1,404 | 785 | 7,388 |

TABLE 1-continued

|  | Example 1 | Example 2 | Example 3 | Comparative Example 1 | Comparative Example 3 |
|---|---|---|---|---|---|
| Epoxy equivalent of polyglycidyl ether | 1,156 | 702 | 702 | 393 | 3,694 |
| AEP-22*3 (parts) | 494.5 | 823.2 | 746 | 1,131.9 | 214 |
| Molecular weight of flexible resin | 29,800 | 18,100 | 69,200 | 19,300 | 10,100 |
| Amine equivalent of flexible resin | 32.3 | 44.3 | 41.9 | 57.4 | 20.6 |

*1Polypropylene glycol diglycidyl ether having an epoxy equivalent of 294, available from Sanyo Kasei Co.
*2Dimer acid having an acid value of 192, available from Henkel Hakusui Co.
*3An adduct formed by adding monoethanolamine to ethylene oxide, available from Sanyo Kasei Co.; amino polyether

TABLE 2

|  | Example 4 | Example 5 | Example 6 | Comparative Example 1 | Comparative Example 2 | Comparative Example 3 |
|---|---|---|---|---|---|---|
| Flexible resin | A | B | C | D | NO | E |
| Impact resistance*1 | 50/50 | 50/50 | 50/50 | 40/20 | 10/30 | 50/50 |
| Adhesion with a top coating*2 | 100/100 | 100/100 | 100/100 | 100/100 | 100/100 | 50/100 |

*1Front side/back side is shown. 50 cm of maximum, 0 cm of minimum
*2Number of cross-cuts kept on the coated surface/100 of cross-cuts According to the results of the above Examples and Comparative Examples, it is recognized that by the resin that the amino-polyether-modified epoxy of the present invention is mixed in a cationic electrodeposition paint, impact resistance can be improved without decrease of adhesion with a top coating. In addition, according to Example 4 and Comparative Example 2, the use of the amino-polyether-modified epoxy of the present invention makes it possible to decrease an amount of solvent without lowering appearance of an electrodeposited coating.

[Comparison of thickness of electrodeposited coating]

The cationic electrodeposition paints prepared in Example 1 and Comparative Example 2 were electrodeposited on a steel plate treated with zinc phosphate at a voltage of 250V for 2 minutes and cured at 170° C. for 20 minutes. The measured thickness of the coatings were 24 μm and 12.5 μm, respectively. Therefore, it is recognized that when electrodeposition was carried out under the same condition, the addition of the amino-polyether-modified epoxy in a cationic electrodeposition paint thickens a thickness of an electrodeposited coating.

TECHQUNICAL EFFECTS OF THE INVENTION

The electrodeposited coating obtained from the cationic electrodeposition paint composition containing the amino-polyether-modified epoxy which is a novel compound of the present invention enhances flexibility, with keeping adhesion with a substrate and a intermediate coating or a top coating. Therefore, the cationic electrodeposition paint composition of the present invention has excellent chipping-resistance and is suitable as paint for an outer plate of an automobile. In addition, the above amino-polyether-modified epoxy is mixed in a cationic electrodeposition paint, whereby an amount of used solvent can be decreased as well as thickness of an obtained electrodeposited coating can be thicker.

What is claimed is:

1. An amino-polyether-modified epoxy, obtained by reacting an amino polyether represented by the formula:

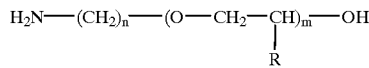

wherein m is an integer of 5 or more, R is hydrogen, methyl group or ethyl group, and n is 2 or 3, with a polyglycidyl ether having a molecular weight of 1,000 to 7,000 and an epoxy equivalent of 500 to 3,500, wherein said polyglycidyl ether is obtained from polyoxyalkyleneglycol diglycidyl ether having a molecular weight of 500 to 1,000 and a polycyclic phenol compound, and wherein an equivalent ratio of a primary amino group of said amino polyether to an epoxy group of said polyglycidyl ether is within a range of 0.52 to 1.0.

2. The amino-polyether-modified epoxy according to claim 1, wherein m is an integer from 5 to 25, R is methyl group, and n is 2.

3. The amino-polyether-modified epoxy according to claim 1, wherein the amino-polyether-modified epoxy has a molecular weight within a range of 10,000 to 100,000.

4. The amino-polyether-modified epoxy according to claim 1, wherein said polyoxyalkyleneglycol diglycidyl ether is polyoxy propylene glycol diglycidyl ether and said polycyclic phenol compound is bisphenol A.

5. The amino-polyether-modified epoxy according to claim 1, wherein said polyglycidyl ether is obtained from the polyoxyalkyleneglycol diglycidyl ether and the polycyclic phenol compound as well as a dicarboxylic acid containing a long chain alkyl group.

6. The amino-polyether-modified epoxy according to claim 5 wherein said polyoxyalkyleneglycol diglycidyl ether is polyoxy propylene glycol diglycidyl ether, said polycyclic phenol compound is bisphenol A and said dicarboxylic acid containing a long chain alkyl group is a dimer acid.

7. A cationic electrodeposition paint composition comprising a flexible resin comprising the amino-polyether-modified epoxy according to claim 1, an amine-modified epoxy resin and a blocked polyisocyanate curing agent.

8. The cationic electrodeposition paint composition according to claim 7 wherein said amine-modified epoxy resin contains an oxazolidone ring.

* * * * *